H. ANDERSON.
CORN HANGER.
APPLICATION FILED DEC. 18, 1909.
958,687.
Patented May 17, 1910.
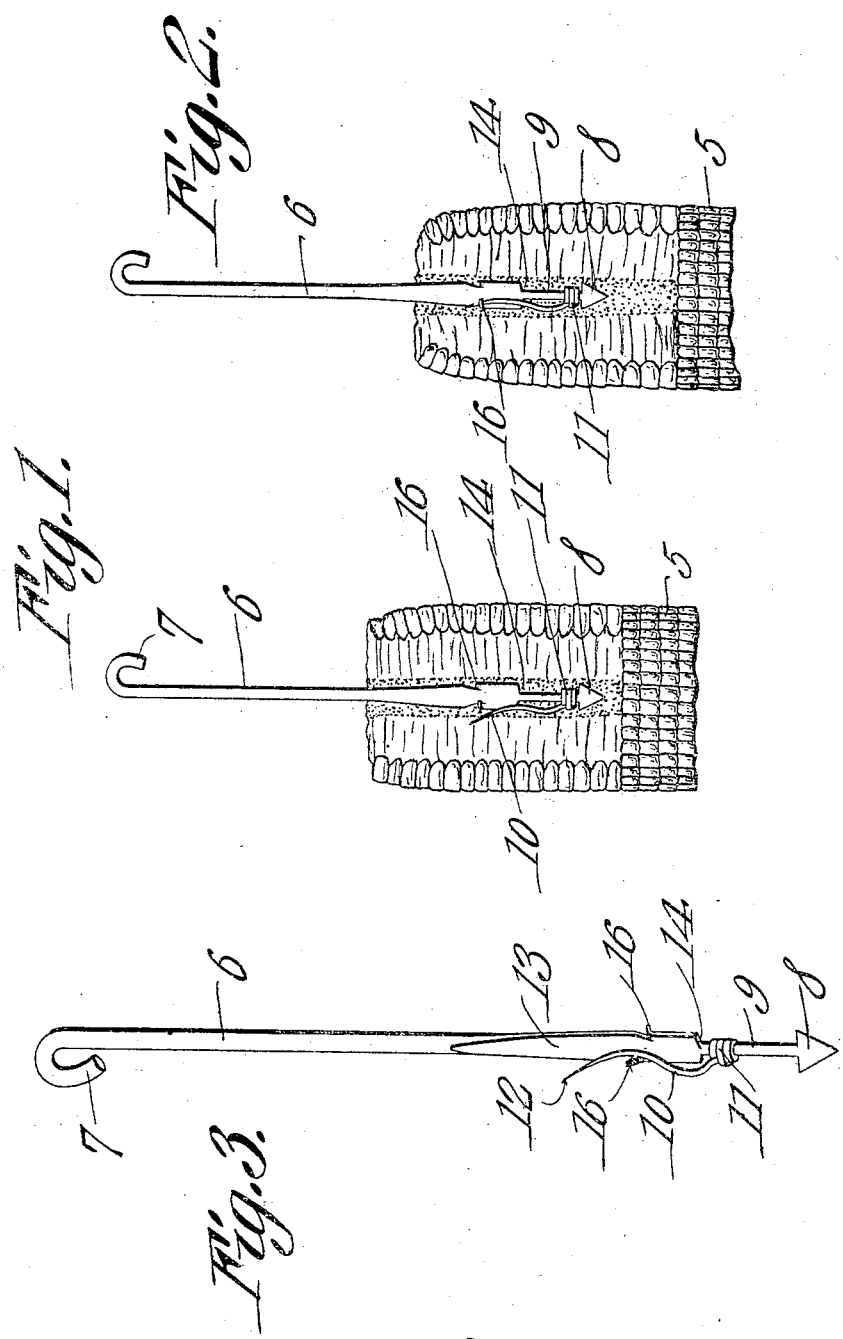
Witnesses
Inventor
Henry Anderson.
By C. A. Snow & Co.
Attorneys

UNITED STATES PATENT OFFICE.

HENRY ANDERSON, OF CALAMUS, IOWA.

CORN-HANGER.

958,687.  Specification of Letters Patent.  Patented May 17, 1910.

Application filed December 18, 1909. Serial No. 533,922.

*To all whom it may concern:*

Be it known that I, HENRY ANDERSON, a citizen of the United States, residing at Calamus, in the county of Clinton and State of Iowa, have invented a new and useful Corn-Hanger, of which the following is a specification.

This invention relates to corn hangers and has for its object to provide a corn hanger that in addition to its ear engaging barb will have a laterally projecting spur to engage the ear remote from the barb and prevent the accidental disengagement of the ear.

A further object is to provide a corn hanger with fingers adapted to grasp the spur so that the barb and spur may be simultaneously disengaged from the ear.

A still further object is to provide a corn hanger having a spur that may be so embedded in the cob of the suspended ear that the weight of the ear operates to impale the same upon the penetrating end of the spur.

With the above advantages and other objects in view which will appear as the description proceeds, my invention embraces certain novel details of construction and combination of parts which will be hereinafter more fully described and claimed.

In the accompanying drawing forming part of this specification,—Figure 1 is a side elevation of my improved corn hanger shown embedded in an ear of corn. Fig. 2 is a side elevation of the corn hanger showing the same in position for being extracted from the ear. Fig. 3 is a perspective view of the corn hanger showing the ear engaging spur grasped by one of the disengaging fingers of the hanger.

One of the difficulties experienced in the usual form of corn hanger is that as the suspended ear of seed corn dries up, the opening made by the barb of the corn hanger gradually shrinks away from the barb until finally the weight of the ear is sufficient to cause the ear to drop from the hanger. To obviate this disadvantage, I provide a resilient spur slidingly mounted upon the shank of the corn hanger and which extends rearwardly from the barb of the hanger and engages the cob of the suspended ear of corn so that the weight of the ear tends to firmly impale the ear upon the barb regardless of shrinkage or other changes taking place in the ear.

Referring now to the drawing in which like characters of reference designate similar parts in the views shown, 5 designates an ear of seed corn of the usual and well known kind. The corn hanger comprising the subject matter of this invention consists of a shank 6 preferably formed from a single piece of wire or similar material having at one end a hook 7 by means of which the hanger may be suspended from any convenient nail or staple and at the other end an ear penetrating barb 8. The shank 6 is reduced adjacent its barb to form a tubular neck 9 upon which is slidingly mounted the ear engaging spur 10. The ear engaging spur is preferably formed of resilient material and is provided at one extremity with a suitable eye 11 adapted to slidingly fit the tubular shank 9 and at its opposite extremity with a sharp pointed end 12 adapted to penetrate the ear.

The shank 6 is flattened adjacent the neck 9, as shown at 13 and terminates in abrupt shoulders 14 which limit the sliding movement of the spur in one direction, the shoulders 15 of the barb limiting the sliding movement of the spur in the opposite direction. Formed upon the lateral edges of the flattened portion 13 is a pair of outstanding fingers 16 which grasp the spur and disengage it from the ear, as will presently appear.

In operation the spur 8 is driven into the cob at the butt end of the ear and given a slight turn to the right, to free the spur from the fingers. The shank is then retracted so that the disengaged spur is embedded deeply into the ear. The ear is thus impaled upon the spur in a manner similar to being impaled upon a hook and it is evident when in this position the weight of the ear will serve to hold the ear secured upon the spur regardless of shrinkage or other changes in the ear.

To remove the corn hanger from the ear, the shank is pushed into the ear until the eye 11 engages the shoulder 14 and is twisted at the same time until one of the fingers 12 is in engagement with the spur, as shown in Fig. 3 when the shank is given a retracting movement which operates to simultaneously disengage the spur and barb from the ear.

From the foregoing description, taken in connection with the accompanying drawing, it is thought that the construction and operation of my invention will be easily understood without a more extended explanation, it being understood that various changes may be made in the form, proportion and minor details of construction without departing from the spirit or sacrificing any of the advantages of the invention.

What is claimed is:

1. A corn hanger consisting of a shank adapted to penetrate the ear, an ear engaging spur mounted for longitudinal movement upon said shank, means for limiting the sliding movement of the spur, and means carried by the shank for grasping the spur and disengaging it from the ear.

2. A corn hanger consisting of a shank terminating in an ear penetrating barb, an ear engaging spur slidingly mounted on said shank and having its penetrating end disposed remote from said barb, stops upon the shank to limit the sliding movement of said spur, and means upon the shank for grasping the spur and disengaging it from the ear.

3. A corn hanger consisting of a shank having an ear penetrating barb, a resilient ear engaging spur slidingly mounted on said shank, stop shoulders adjacent said barb to limit the sliding movement of the spur, and a finger projecting from the shank adapted to grasp the spur and disengage it from the ear.

In testimony that I claim the foregoing as my own, I have hereto affixed my signature in the presence of two witnesses.

HENRY ANDERSON.

Witnesses:
   HANS N. PEDERSEN,
   EDITH BLAKE.